(12) United States Patent
Suo et al.

(10) Patent No.: US 12,250,755 B2
(45) Date of Patent: Mar. 11, 2025

(54) SECONDARY LIGHT ASSEMBLY, NIGHT LIGHT ASSEMBLY, LIGHT FIXTURE, AND METHOD AND UNIT FOR CONTROLLING SECONDARY LIGHT ASSEMBLY

(71) Applicant: SAVANT TECHNOLOGIES LLC, East Cleveland, OH (US)

(72) Inventors: Yin Suo, Shanghai (CN); Yao Fu, Shanghai (CN); Huisheng Zhou, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 415 days.

(21) Appl. No.: 17/572,508

(22) Filed: Jan. 10, 2022

(65) Prior Publication Data

US 2022/0225478 A1 Jul. 14, 2022

(30) Foreign Application Priority Data

Jan. 11, 2021 (CN) .......................... 202110033089.1

(51) Int. Cl.
*H05B 45/12* (2020.01)
*F21V 23/04* (2006.01)
*F21Y 115/10* (2016.01)

(52) U.S. Cl.
CPC ......... *H05B 45/12* (2020.01); *F21V 23/0435* (2013.01); *F21V 23/0464* (2013.01); *F21Y 2115/10* (2016.08)

(58) Field of Classification Search
CPC .... H05B 45/12; H05B 47/105; H05B 47/155; F21V 23/0435; F21V 23/0464
See application file for complete search history.

(56) References Cited

U.S. PATENT DOCUMENTS 6,909,239 B2 6/2005 Gauna
11,255,498 B2 * 2/2022 Van Winkle .......... F21V 21/044
(Continued)

FOREIGN PATENT DOCUMENTS

| CA | 3055254 A1 * | 9/2018 | .............. F21S 8/061 |
| CN | 203757408 U | 8/2014 | |
| CN | 109340625 A | 2/2019 | |

OTHER PUBLICATIONS

Office Action for Canadian Application No. 3,140,339 dated Apr. 15, 2024, 5 pages.

*Primary Examiner* — Alexander H Taningco
*Assistant Examiner* — Pedro C Fernandez
(74) *Attorney, Agent, or Firm* — Wood IP LLC; Theodore A. Wood (57) ABSTRACT

The disclosure provides a secondary light assembly, a night light assembly, a light fixture, and a method and unit for controlling the secondary light assembly. The secondary light assembly can be mounted on a main light assembly of the light fixture. The main light assembly is configured to provide first lighting light. The secondary light assembly includes: light emitting devices configured to provide second lighting light, a main sensor configured to detect the first lighting light of the main light assembly and generate a lighting light detection signal according to a detection result; and a control part configured to receive the lighting light detection signal from the main sensor and control the light emitting devices of the secondary light assembly at least based on the lighting light detection signal.

21 Claims, 4 Drawing Sheets

(56) References Cited

U.S. PATENT DOCUMENTS

| | | | |
|---|---|---|---|
| 2005/0259416 A1* | 11/2005 | Gauna | H05B 35/00 |
| | | | 362/227 |
| 2010/0328952 A1* | 12/2010 | Chen | F21V 17/02 |
| | | | 362/249.05 |
| 2015/0338077 A1* | 11/2015 | Johnson | F21V 23/0442 |
| | | | 362/249.02 |
| 2018/0160509 A1* | 6/2018 | Treible, Jr. | H01Q 1/42 |
| 2019/0075634 A1* | 3/2019 | Cho | F21V 23/045 |
| 2020/0018469 A1* | 1/2020 | Kohen | H01R 24/38 |
| 2020/0191344 A1 | 6/2020 | Van Winkle | |
| 2021/0318486 A1* | 10/2021 | Li | F21S 8/04 |

* cited by examiner

SECONDARY LIGHT ASSEMBLY, NIGHT LIGHT ASSEMBLY, LIGHT FIXTURE, AND METHOD AND UNIT FOR CONTROLLING SECONDARY LIGHT ASSEMBLY

TECHNICAL FIELD

The disclosure generally relates to a light fixture, in particular to a light fixture with both a main light assembly and a night light assembly, such as a down light fixture with a main light assembly and a night light assembly, wherein the night light assembly can be detachably attached to the main light assembly.

BACKGROUND

LED light fixtures (such as LED ceiling down light fixtures) are well known in the field. An LED down light fixture usually consists of a housing that can be mounted in ceiling or wall, LED devices located in the housing, an electronic circuit for supplying power to the LED devices, and a diffuser for diffusing the light from the LED devices.

There is also an LED night light component that emits low-intensity LED light to provide lighting at night. The night light component is often used to alleviate fear in dark rooms, especially in children, and to prevent a person being tripped over objects on the ground, etc. The night light component is usually installed in an electrical socket located near the floor or on walls and is always on at night, that is, even when no person is present in a space at night, the night light component in this space stays on until dawn when the user wakes up and turns it off, thus wasting energy.

In the related art, Chinese application publication No. CN109340625A discloses a down light fixture, which includes a sensor for detecting person and ambient brightness, so as to start the down light fixture by means of a single chip microcomputer when a person is detected and the ambient brightness is detected to be below a threshold, but the down light fixture is not equipped with a night light component.

In the related art, US application publication No. US20200191344A discloses a light fixture that integrates a night light component with a main light component, for example, a light fixture with both main light part and night light part. However, in this application, the night light part is sandwiched between various assemblies of the main light part, which makes the overall structure of the light fixture complex; moreover, the turning on and off of the night light part are still implemented by a user operating a switch on the wall, thus causing inconvenience to the user.

In the related art, U.S. Pat. No. 6,909,239B2 discloses a light fixture with an LED and an incandescent light component. The LED in the light fixture keeps on at night and can be turned off when a motion sensor in the light fixture detects movement and at this time the incandescent light component would be turned on to provide brighter lighting to the area.

The light fixture that integrates the night light component and the main light component in the related art is complex in structure, poor in flexibility of design changes and low in user convenience.

SUMMARY

The main object of the disclosure is to realize a light fixture with both a main light and night light by detachably attaching a night light assembly to a main light assembly, so as to solve the problems of complex structure, poor flexibility of design changes and low user convenience of the light fixture that is formed by integrating the night light assembly and the main light assembly in the related art, and thus the user convenience can be improved, the power consumption can be saved, the cost for driving the night light assembly can be reduced, the value of the night light assembly can be increased, and the design flexibility of the light fixture with both the main light assembly and the night light assembly can be improved.

In order to achieve the object above, according to an aspect of the disclosure, a secondary light assembly is provided, the secondary light assembly can be installed on a main light assembly of a light fixture. The main light assembly is configured to provide first lighting light. The secondary light assembly includes: light emitting devices configured to provide second lighting light, a main sensor configured to detect the first lighting light of the main light assembly and generate a lighting light detection signal according to a detection result; and a control part configured to receive the lighting light detection signal from the main sensor and control the light emitting devices of the secondary light assembly at least based on the lighting light detection signal.

In this way, by using the lighting light detection signal of the main light assembly to control the light emitting devices of the secondary light assembly instead of using a switch on the wall to control the light emitting devices of the secondary light assembly in the related art, the flexibility of design changes can be improved, the structure of the light fixture can be simplified, and the user convenience can be improved. Moreover, because the secondary light assembly can be detachably installed on the main light assembly of the light fixture, the secondary light assembly can be sold separately, and then the value of the secondary light assembly is further increased.

Further, according to an embodiment of the disclosure, the control part is further configured to determine a plurality of brightness variation rules of the first lighting light according to the lighting light detection signal, and control, according to each of the plurality of brightness variation rules, the light emitting devices of the secondary light assembly to operate in a corresponding operation mode of a plurality of operation modes.

In this way, by making use of the brightness variation rule of the lighting light of the main light assembly to realize the plurality of operation modes of the secondary light assembly, a user can have more choice space, and the user may choose the corresponding operation mode according to his/her own needs, the user's needs for energy efficiency, stronger lighting and desired environmental atmosphere can be satisfied, meanwhile, the structure of the light fixture is simplified, and the design flexibility of the light fixture is improved.

Further, according to an embodiment of the disclosure, when the control part determines that the first lighting light has the first brightness variation rule of the plurality of brightness variation rules according to the lighting light detection signal, it controls the light emitting devices to operate in the first operation mode of the plurality of operation modes. The secondary light assembly further includes: an environmental information sensor configured to detect environmental information in the environment where the light fixture is located and generate an environment detection signal when predetermined environmental information is detected. In the first operation mode, the control part controls, according to the environment detection signal, the light emitting devices to operate according to a corresponding light emitting logic of a plurality of different light emitting logics.

In this way, the light emitting devices can be automatically controlled to emit or not emit light according to the environmental information of the environment where the light fixture is located, thus improving the user convenience, and avoiding energy waste to achieve the effect of energy saving.

Further, according to an embodiment of the disclosure, the environment detection signal includes a weak light indication signal and/or a human presence signal. The environmental information sensor includes: a light intensity sensor configured to detect a light intensity in the environment and generate the weak light indication signal when the detected light intensity in the environment is lower than a predetermined light intensity; and a human sensor configured to detect the presence of a person in the environment and generate the human presence signal when a person is detected in the environment.

In this way, the light emitting devices can be automatically controlled to emit or not emit light according to whether the environment where the light fixture is located is dark and whether there is a person in the environment, so the lighting light can be automatically provided for the person in the dark environment, which can eliminate people's fear of darkness, prevent the person from being tripped by objects on the ground, etc., and the light emitting devices would not be turned on in a non-dark environment or when there is no person, so as to avoid energy waste and achieve the effect of energy saving.

Further, according to an embodiment of the disclosure, the light emitting logic includes that: the light emitting devices are controlled to emit light when the control part receives the weak light indication signal and the human presence signal; and the light emitting devices are controlled to not emit light when the control part receives only the weak light indication signal or only the human presence signal.

In this way, the light emitting devices can be automatically controlled to emit or not emit light according to whether the environment where the light fixture is located is dark and whether there is a person in the environment, thereby achieving the effect of energy saving while meeting the user's lighting needs.

Further, according to an embodiment of the disclosure, when the control part determines that the first lighting light has the second brightness variation rule of the plurality of brightness variation rules according to the lighting light detection signal, it controls the light emitting devices to operate in the second operation mode of the plurality of operation modes. In the second operation mode, the control part is further configured to determine the turning on or off or other lighting modes of the main light assembly according to the lighting light detection signal, and control the turning on or off or the corresponding lighting mode of the light emitting devices according to the determination result, so that the light emitting devices operate synchronously with the main light assembly.

In this way, stronger lighting is provided or no lighting is provided according to the user's needs, thereby improving the user convenience and achieving energy saving.

Further, according to an embodiment of the disclosure, when the control part determines that the first lighting light has the third brightness variation rule of the plurality of brightness variation rules according to the lighting light detection signal, it controls the light emitting devices to operate in the third operation mode of the plurality of operation modes. In the third operation mode, the control part is further configured to determine whether the main light assembly is turned off according to the lighting light detection signal, and control the light emitting devices to emit light in a specific pattern when it is determined that the main light assembly is turned off.

In this way, ambient (or accent) lighting of the specific pattern can be provided according to the user's needs.

Further, according to an embodiment of the disclosure, the secondary light assembly further includes a rechargeable battery configured to supply power to the main sensor, the light intensity sensor, the human sensor, the control part and the light emitting devices.

In this way, the secondary light assembly can be controlled to be on and off independent of the control of a switching device for the main light assembly, so that the user's needs for energy saving, stronger lighting, night lighting and desired environmental atmosphere can be met.

Further, according to an embodiment of the disclosure, the main light assembly can supply power to the main sensor, the light intensity sensor, the human sensor, the control part and the light emitting devices in either a wireless coil power supply mode or a wired power supply mode and charge the rechargeable battery.

In this way, energy can be stored in the rechargeable battery, so that the secondary light assembly can still be controlled to provide the lighting light when the main light assembly is turned off so that it cannot supply power to the secondary light assembly.

Further, according to an embodiment of the disclosure, the secondary light assembly has a surface ring (or trim) structure, which includes an annular bottom wall, an annular top wall being parallel and opposite to the annular bottom wall, and a peripheral side wall between the annular bottom wall and the annular top wall. The light emitting devices are arranged on the peripheral side wall, the main sensor and the control part are arranged on the annular bottom wall opposite to the main light assembly, and the light intensity sensor, the human sensor and the rechargeable battery are arranged on the annular top wall.

In this way, the light fixture with the main light assembly and the secondary light assembly can be realized by directly installing the secondary light assembly on the existing main light assembly by means of the surface ring structure without changing the shape and structure of the main light assembly.

Further, according to an embodiment of the disclosure, the secondary light assembly can be installed on the main light assembly of the light fixture by fixing the annular bottom wall to the surface ring of the main light assembly by means of magnetic connection or mechanical connection.

In this way, the secondary light assembly can be installed on the main light assembly according to the configuration of the surface ring structure of the existing main light assembly without changing the structure of the main light assembly and without additional attachment accessories.

Further, according to an embodiment of the disclosure, the mechanical connection and electrical connection between the secondary light assembly and the main light assembly can be realized by inserting each pin arranged on the annular bottom wall of the secondary light assembly into a corresponding jack of jacks arranged on the surface ring of the main light assembly.

In this way, the mechanical connection between the secondary light assembly and the main light assembly can be realized by means of the pins which also can be used to collect the current of the main light assembly to supply power to each component of the secondary light assembly, thus simplifying the structure of the light fixture with the secondary light assembly and the main light assembly.

According to another aspect of the disclosure, a night light assembly is provided, which can be installed on a main light assembly of a light fixture. The main light assembly is configured to provide the first lighting light. The night light assembly includes: light emitting devices configured to provide the second lighting light, the light intensity of which is lower than that of the first lighting light; a main sensor configured to detect the first lighting light of the main light assembly and generate the lighting light detection signal according to the detection result; and a control part configured to receive the lighting light detection signal from the main sensor and control the light emitting devices of the night light assembly at least based on the lighting light detection signal.

In this way, a down light fixture with the night light assembly and the main light assembly can be realized, and by using the lighting light detection signal of the main light assembly to control the light emitting devices of the night light assembly instead of using a switch on the wall to control the light emitting devices of the night light assembly in the related art, the flexibility of design changes of the night light assembly can be improved, the structure of the down light fixture can be simplified, and the user convenience can be improved. Moreover, because the night light assembly can be detachably installed on the main light assembly of the down light fixture, the night light assembly can be sold separately, and then the value of the night light assembly is further increased.

According to another aspect of the disclosure, a light fixture is provided, the light fixture includes a main light assembly and the above secondary light assembly or night light assembly. The secondary light assembly or night light assembly is installed on the main light assembly to form the light fixture. The turning on and off of the main light assembly is controlled by a switch, a remote control, and a Bluetooth or Wifi intelligent mode.

In this way, the separate control modes of the main light assembly and the night light assembly are realized, thereby meeting a variety of user's needs, such as stronger lighting, night lighting and atmosphere lighting.

According to another aspect of the disclosure, a method for controlling a secondary light assembly is provided. The secondary light assembly can be installed on a main light assembly of a light fixture. The main light assembly is configured to provide the first lighting light. The secondary light assembly includes: light emitting devices configured to provide the second lighting light. The method includes: detecting the first lighting light of the main light assembly and generating a lighting light detection signal according to a detection result; and controlling the light emitting devices of the secondary light assembly at least based on the lighting light detection signal.

In this way, by using the lighting light detection signal of the main light assembly to control the light emitting devices of the secondary light assembly instead of using a switch on the wall to control the light emitting devices of the secondary light assembly in the related art, the flexibility of design changes of the secondary light assembly can be improved, the structure of the light fixture can be simplified, and the user convenience can be improved.

Further, according to another embodiment of the disclosure, the method further includes determining a plurality of brightness variation rules of the first lighting light according to the lighting light detection signal, and controlling the light emitting devices of the secondary light assembly to operate in a corresponding operation mode of a plurality of operation modes according to each of the plurality of brightness variation rules.

In this way, by making use of the brightness variation rule of the lighting light of the main light assembly to realize the plurality of operation modes of the secondary light assembly, the user can have more choice space, and the user may choose the corresponding operation mode according to his/her own needs, therefore, the user's needs for energy efficiency, stronger lighting and desired environmental atmosphere can be met.

Further, according to another embodiment of the disclosure, the method further includes: when it is determined that the first lighting light has the first brightness variation rule of the plurality of brightness variation rules, controlling the light emitting devices to operate in the first operation mode of the plurality of operation modes; in the first operation mode, detecting the environmental information in the environment where the light fixture is located, generating the environment detection signal when the predetermined environmental information is detected, and controlling, according to the environment detection signal, the light emitting devices to operate according to a corresponding light emitting logic of a plurality of different light emitting logics.

In this way, the light emitting devices can be automatically controlled to emit or not emit light according to the environmental information of the environment where the light fixture is located, thus improving the user convenience and avoiding energy waste to achieve the effect of energy saving.

Further, according to another embodiment of the disclosure, generating the environment detection signal includes: detecting a light intensity in the environment and generating a weak light indication signal when the detected light intensity in the environment is lower than a predetermined light intensity; and detecting the presence of a person in the environment and generating a human presence signal when a person is detected in the environment.

In this way, the light emitting devices can be automatically controlled to emit or not emit light according to whether the environment where the light fixture is located is dark and whether there is a person in the environment, so the lighting light can be automatically provided for the person in the dark environment, which can eliminate people's fear of darkness, prevent the person from being tripped by objects on the ground, etc., and the light emitting devices can be controlled to not emit light in a non-dark environment or when there is no person, so as to avoid energy waste and achieve the effect of energy saving.

Further, according to another embodiment of the disclosure, the light emitting logic includes: the light emitting devices is controlled to emit light when the generated environment detection signal has the weak light indication signal and the human presence signal; and the light emitting devices is controlled to not emit light when the generated environment detection signal has only the weak light indication signal or only the human presence signal.

In this way, the light emitting devices can be automatically controlled to emit or not emit light according to whether the environment where the light fixture is located is dark and whether there is a person in the environment, thereby achieving the effect of energy saving while meeting the user's lighting needs.

Further, according to another embodiment of the disclosure, the method further includes: when it is determined that the first lighting light has the second brightness variation rule of the plurality of brightness variation rules, controlling the light emitting devices to operate in the second operation mode of the plurality of operation modes; determining the turning on or off or other lighting modes of the main light assembly according to the lighting light detection signal; and controlling the turning on or off or the corresponding lighting mode of the light emitting devices according to a determination result, so that the light emitting devices operate synchronously with the main light assembly.

In this way, stronger lighting is provided or no lighting is provided according to the user's needs, thereby improving the user's convenience and achieving energy saving.

Further, according to another embodiment of the disclosure, the method further includes: when it is determined that the first lighting light has the third brightness variation rule of the plurality of brightness variation rules, controlling the light emitting devices to operate in the third operation mode of the plurality of operation modes; in the third operation mode, determining whether the main light assembly is turned off according to the lighting light detection signal, and controlling the light emitting devices to emit light in a specific pattern when it is determined that the main light assembly is turned off.

In this way, ambient lighting of the specific pattern can be provided according to the user's needs.

According to yet another aspect of the disclosure, a control unit used in a secondary light assembly is provided. The secondary light assembly can be installed on a main light assembly of a light fixture. The main light assembly is configured to provide the first lighting light. The light emitting devices of the secondary light assembly are configured to provide the second lighting light. The control unit includes: a main sensor configured to detect the first lighting light of the main light assembly and generate a lighting light detection signal according to a detection result; and a control part configured to receive the lighting light detection signal from the main sensor and control the light emitting devices of the secondary light assembly at least based on the lighting light detection signal.

In this way, the control unit is used to control the secondary light assembly to be on and off independent of the control of a switching device of the main light assembly, so it is no longer necessary to arrange a corresponding drive circuit board in the secondary light assembly, thereby reducing the cost for driving the secondary light assembly, and at the same time, the user's needs for energy efficiency, stronger lighting, night lighting and desired environmental atmosphere can be satisfied.

According to the disclosure, by detachably installing the night light assembly on the main light assembly to realize the light fixture with both the main light and the night light, the structure of the light fixture formed by integrating the night light assembly and the main light assembly can be simplified, the flexibility of design changes of the night light assembly can be improved, the user convenience can be improved, the cost for driving the night light assembly can be reduced, and the value of the night light assembly can be increased.

BRIEF DESCRIPTION OF THE DRAWINGS

The accompanying drawings constituting a part of the present application are used for providing further understanding of the present application. Schematic embodiments of the present application and description thereof are used for illustrating the present application and not intended to form an improper limit to the present application. In the accompanying drawings.

DETAILED DESCRIPTION OF THE EMBODIMENTS

It is to be noted that the embodiments in the disclosure and characteristics in the embodiments may be combined without conflicts. The disclosure will be described below with reference to the drawings and in combination with the embodiments in detail.

It is to be noted that unless otherwise indicated, all technical and scientific terms used herein have the same meaning as that commonly understood by those of ordinary skill in the art to which the disclosure belongs.

In the disclosure, nouns of locality like up, down, top and bottom are usually used in reference to the directions shown in the accompanying drawings, or to the upright, vertical, or gravitational directions of the component themselves, unless otherwise stated. Similarly, for ease of understanding and description, "inside and outside" means the inside and outside relative to the contours of the components themselves, but the above nouns of locality are not used to limit the disclosure.

Figure 1:
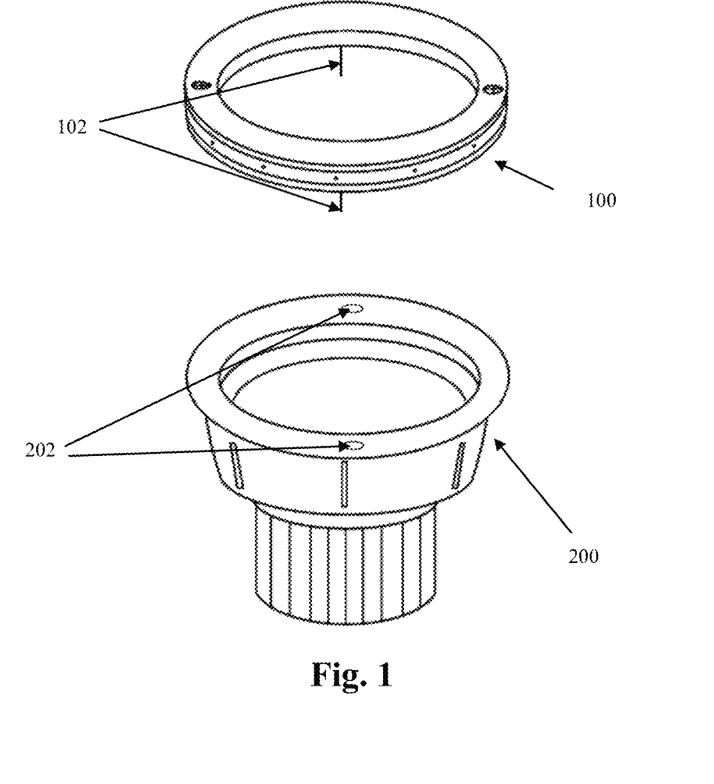
FIG. 1 is an exploded view of a main light assembly and a secondary light assembly of a light fixture according to an embodiment of the disclosure.

FIG. 1 is an exploded view of a main light assembly and a secondary light assembly of a light fixture according to an embodiment of the disclosure. As shown in FIG. 1, a secondary light assembly 100 according to the disclosure is detachably installed on a main light assembly 200. The secondary light assembly 100 has a surface ring (for example, a trim) structure, which can be fixed to the surface ring of the main light assembly 200 in a manner of a magnetic connection or mechanical connection, and thereby enabling the secondary light assembly 100 to be installed on the main light assembly 200. For example, the secondary light assembly 100 may be installed on the main light assembly 200 in a manner of a magnetic attraction by arranging a magnetic material on the surface ring of the secondary light assembly 100; or the secondary light assembly 100 may be installed on the main light assembly 200 in a manner of mechanical connection by using a clamp to clamp the surface ring of the secondary light assembly 100 and the surface ring of the main light assembly 200 together; or the secondary light assembly 100 may be installed on the main light assembly 200 by making protrusions disposed on the secondary light assembly 100 match and insert into grooves disposed on the main light assembly 200 by means of rotation.

Optionally, pins 102 may be arranged on the surface ring structure of the secondary light assembly 100, and the secondary light assembly 100 and the main light assembly 200 are connected mechanically and electrically by inserting each of the pins 102 arranged on the surface ring structure of the secondary light assembly 100 into a corresponding one of jacks 202 arranged on the surface ring of the main light assembly 200.

The above describes the assembly of the secondary light assembly 100 on the main light assembly 200 in general. Next, the configuration of the secondary light assembly 100 will be described in detail.

Figure 2:
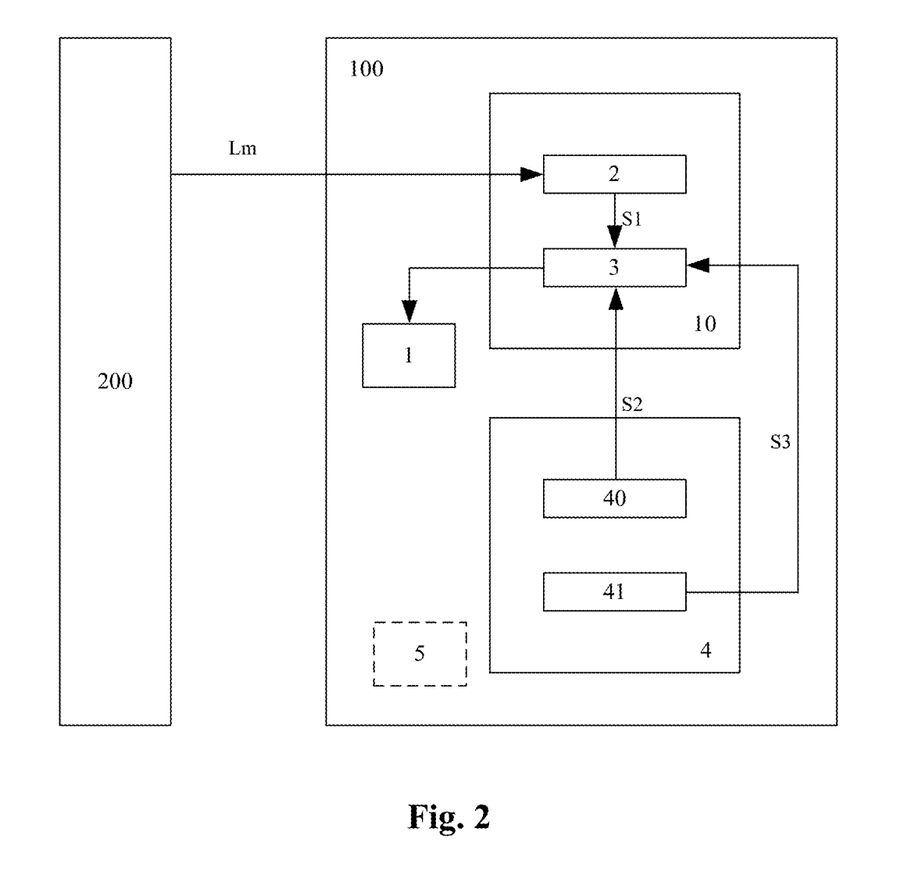
FIG. 2 is a block diagram of configuration of a secondary light assembly in FIG. 1 according to an embodiment of the disclosure.

FIG. 2 is a block diagram of configuration of a secondary light assembly in FIG. 1 according to an embodiment of the disclosure. As shown in FIG. 2, the secondary light assembly 100 receives first lighting light Lm from the main light assembly 200. The secondary light assembly 100 includes: light emitting devices 1 configured to provide second lighting light; a main sensor 2 configured to detect the first lighting light Lm provided by the main light assembly 200 and generate a lighting light detection signal S1 according to a detection result; and a control part 3 configured to receive the lighting light detection signal S1 from the main sensor 2 and control the light emitting devices 1 of the secondary light assembly 100 at least based on the lighting light detection signal S1. The control part 3 may be a microcontroller unit.

Optionally, the main sensor 2 and the control part 3 may be integrated into a whole to form a control unit 10, so that the light emitting devices 1 of the secondary light assembly 100 are controlled by the control unit 10, Specifically, the control part 3 may be configured to determine a plurality of brightness variation rules of the first lighting light Lm according to the lighting light detection signal S1, and control, according to each of the plurality of brightness variation rules, the light emitting devices 1 of the secondary light assembly 100 to operate in a corresponding operation mode of a plurality of operation modes. The plurality of operation modes may include a night light (PIR) mode, a synchronous (SYNC) mode, and an atmosphere (accent) mode.

When the control part 3 determines that the first lighting light Lm has the first brightness variation rule according to the lighting light detection signal S1, it controls the light emitting devices 1 to operate in the first operation mode. The first operation mode may be the night light mode. For example, when the main light assembly 200 is turned on and then turned off once within the predetermined time of is by use of control means, such as a switch on the wall, a remote control and a Bluetooth and Wifi intelligent mode, the control part 3 determines that the first lighting light Lm has the first brightness variation rule, that is, the first brightness variation rule may be that the first lighting light Lm is detected to change between brightness and darkness once within the predetermined time such as 1 s, and in this case, the control part 3 controls the light emitting devices 1 to operate in the night light mode.

When the control part 3 determines that the first lighting light Lm has the second brightness variation rule according to the lighting light detection signal S1, it controls the light emitting devices 1 to operate in the second operation mode. The second operation mode may be the synchronous mode. For example, when the main light assembly 200 is turned on and off once within the predetermined time of 3 s with control means, such as the switch on the wall, the remote control and the Bluetooth and Wifi intelligent mode, it is determined that the first lighting light Lm has the second brightness variation rule, that is, the second brightness variation rule may be that the first lighting light Lm is detected to change between brightness and darkness once within the predetermined time such as 3 s, and in this case, the control part 3 controls the light emitting devices 1 to operate in the synchronous mode.

When the control part 3 determines that the first lighting light Lm has the third brightness variation rule according to the lighting light detection signal S1, it controls the light emitting devices 1 to operate in the third operation mode. The third operation mode may be the atmosphere mode. For example, when the main light assembly 200 is turned on and off three times within the predetermined time of 5 s with the control means, such as the switch on the wall, the remote control and the Bluetooth and Wifi intelligent mode, it is determined that the first lighting light Lm has the third brightness variation rule, that is, the third brightness variation rule may be that the first lighting light Lm is detected to change between brightness and darkness three times within the predetermined time such as 5 s, and in this case, the control part 3 controls the light emitting devices 1 to operate in the atmosphere mode.

The above first brightness variation rule, second brightness variation rule and third brightness variation rule are only examples, and the disclosure is not limited to this. Other brightness rules may be set for the first brightness variation rule, the second brightness variation rule and the third brightness variation rule, as long as the three brightness rules can be distinctly distinguished.

The secondary light assembly 100 may further include: an environmental information sensor 4 configured to detect environmental information in the environment where the light fixture is located and generate an environment detection signal when predetermined environmental information is detected.

In a specific example, the environmental information sensor 4 may include a light intensity sensor 40 configured to detect a light intensity in the environment and generate a weak light indication signal S2 when the detected light intensity in the environment is lower than a predetermined light intensity; and a human sensor 41 configured to detect the presence of a person in the environment and generate a human presence signal S3 when a person is detected in the environment. Therefore, the environment detection signal may include the weak light indication signal S2 and/or the human presence signal S3. As an example, the human sensor 41 may be an infrared sensor.

In the first operation mode as the night light mode, the control part 3 controls, according to the weak light indication signal S2 and/or the human presence signal S3, the light emitting devices 1 to operate according to a corresponding light emitting logic of a plurality of different light emitting logics. Specifically, the control part 3 controls the light emitting devices 1 to emit light (i.e. light up) if it receives the weak light indication signal S2 and the human presence signal S3; and the control part 3 controls the light emitting devices 1 to not light up if it receives only the weak light indication signal S2 or only the human presence signal S3.

As an example, when the users rest at night and all the light fixtures are turned off, if a user needs to pass through the environment where a light fixture with the secondary light assembly and the main light assembly is arranged, the light intensity sensor 40 detects that the light intensity in the environment is lower than the predetermined light intensity and generates the weak light indication signal S2, and the human sensor 41 detects the presence of a person in the environment and generates the human presence signal S3; in this case, the control part 3 receives both the weak light indication signal S2 and the human presence signal S3, and controls the light emitting devices 1 to be turned on to provide the lighting light for the passing user. On the other hand, if the user finishes his/her needs and leaves the environment, the light intensity sensor 40 detects that the light intensity in the environment is lower than the predetermined light intensity and generates the weak light indication signal S2, but the human sensor 41 does not detect the presence of a person in the environment and thus does not generate the human presence signal S3; in this case, the control part 3 receives only the weak light indication signal S2, so it controls the light emitting devices 1 to be turned off.

As an example, in the daytime, even if a user passes through the environment where the light fixture with the secondary light assembly and the main light assembly is located, the light intensity sensor 40 does not generate the weak light indication signal S2 because it does not detect that the light intensity in the environment is lower than the predetermined light intensity; in this situation, the control part 3 only receives the human presence signal S3, so it controls the light emitting devices 1 to not emit light, i.e. it controls the light emitting devices 1 to keep off.

In the second operation mode as the synchronous mode, the control part 3 is further configured to determine, according to the lighting light detection signal, the turning on or off or other lighting modes such as flickering, gradually shading, gradually darkening, and color mixing of the main light assembly 200, and controls the turning on or off or corresponding lighting modes of the light emitting devices 1 according to a determination result, so that the light emitting devices 1 operate synchronously with the main light assembly 200.

As an example, when the user requires strong lighting in the environment where the light fixture with the secondary light assembly and the main light assembly is located at night, the light fixture may be set to be in the synchronous mode, so that the secondary light assembly 100 and the main light assembly 200 may be turned on synchronously to provide the strong lighting for the user.

In the third operation mode as the atmosphere mode, the control part 3 is further configured to determine, according to the lighting light detection signal, whether the main light assembly 200 is turned off, and control the light emitting devices 1 to emit light in a specific pattern when it is determined that the main light assembly 200 is turned off. For example, the light emitting devices 1 emit light in a shade pattern, a smooth pattern, a flashing pattern, and other user-customizable lighting patterns.

As an example, when the user sings and dances in the environment where the light fixture with the secondary light assembly and the main light assembly is located, the light fixture needs to provide atmosphere to make the user more immersed. The user may set the light fixture to be in the atmosphere mode. In the atmosphere mode, the secondary light assembly 100 emits light of a specific pattern to provide the user's desired atmosphere.

Further, as shown in FIG. 2, the secondary light assembly 100 according to an embodiment of the disclosure may include a rechargeable battery 5. The rechargeable battery 5 may be used to supply power to the light emitting devices 1, the main sensor 2, the control part 3, the light intensity sensor 40 and the human sensor 41. It is to be noted that the rechargeable battery 5 is only an example of an embodiment of a power supply device in the disclosure. In other embodiments, a dry battery may also be used, and the rechargeable battery will be only described as an example thereafter.

In addition, the main light assembly 200 can supply power to the light emitting devices 1, the main sensor 2, the control part 3, the light intensity sensor 40 and the human sensor 41 in either a wireless coil power supply mode or a wired power supply mode and charge the rechargeable battery 5.

For example, when the secondary light assembly 100 is installed on the main light assembly 200 in a manner of the magnetic attraction by arranging the magnetic material on the surface ring of the secondary light assembly 100, or when the secondary light assembly 100 is installed on the main light assembly 200 in a manner of the mechanical connection by using the clamp to clamp the surface ring of the secondary light assembly 100 and the surface ring of the main light assembly 200 together, the main light assembly 200 can supply power to the light emitting devices 1, the main sensor 2, the control part 3, the light intensity sensor 40 and the human sensor 41 in the wireless coil power supply mode and charge the rechargeable battery 5.

When the secondary light assembly 100 and the main light assembly 200 are connected mechanically and electrically by inserting the pins 102 arranged on the surface ring structure of the secondary light assembly 100 into the corresponding jacks 202 arranged on the surface ring of the main light assembly 200, the current may be collected from the main light assembly 200 by means of the pins 102, so that the main light assembly 200 supplies power to the light emitting devices 1, the main sensor 2, the control part 3, the light intensity sensor 40 and the human sensor 41 in the wired power supply mode and charge the rechargeable battery 5.

The above specifically describes the preferred exemplary embodiments of the configuration of the secondary light assembly and its specific operation mode, but the disclosure is not limited to this.

As another example, the control part 3 may determine that the main light assembly 200 is turned off according to the lighting light detection signal S1, and determine that the light intensity of the environment where the light fixture is located is weak according to the received weak light indication signal S2 and there is a person according to the human presence signal S3, and at this time, the control part 3 controls the light emitting devices 1 to light up to provide lighting for the person in the environment.

As yet another example, the control part 3 may determine that the main light assembly 200 is turned off according to the lighting light detection signal S1, and control the light emitting devices 1 to emit light in a specific pattern when it is determined that the person is moving frequently, that is, the person may be dancing according to the human presence signal S3.

As yet another example, the control part 3 may determine that the main light assembly 200 is turned on, according to the lighting light detection signal S1, and control the light emitting devices 1 to emit light when it is determined that the user is walking up and down the stairs according to the received human presence signal S3, so as to provide the user with a wider range of strong lighting, thereby facilitating the user to walk up and down the stairs.

Figure 3A:
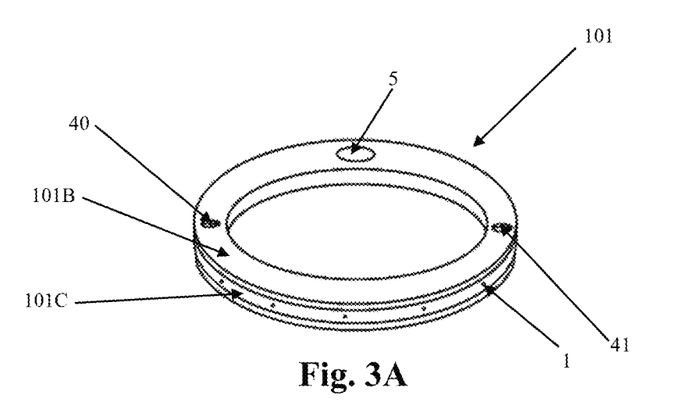
FIG. 3A is a top view of the structure of a secondary light assembly in FIG. 1 according to an embodiment of the disclosure.
Figure 3B:
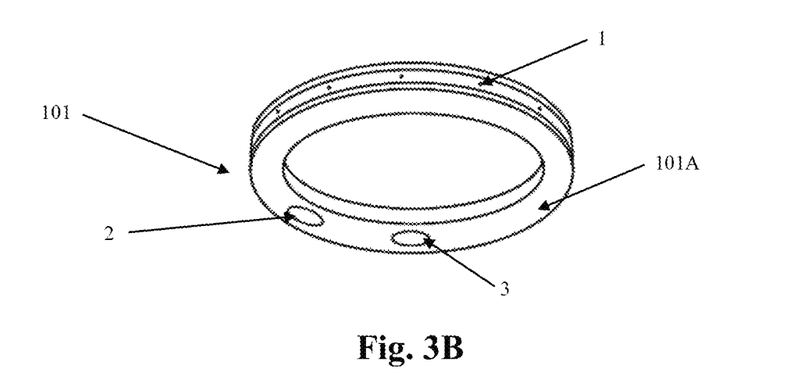
FIG. 3B is a bottom view of the structure of a secondary light assembly in FIG. 1 according to an embodiment of the disclosure.

Next, a description of the structure of the secondary light assembly is given. FIG. 3A is a top view of the structure of a secondary light assembly in FIG. 1 according to an embodiment of the disclosure. FIG. 3B is a bottom view of the structure of a secondary light assembly in FIG. 1 according to an embodiment of the disclosure.

As shown in FIG. 3A and FIG. 3B, the secondary light assembly 100 has a surface ring structure 101. The surface ring structure 101 includes an annular bottom wall 101A, an annular top wall 101B being parallel and opposite to the annular bottom wall 101A, and an peripheral side wall 101C between the annular bottom wall 101A and the annular top wall 101B. The light emitting devices 1 are arranged on the peripheral side wall 101C, and the main sensor 2 and the control part 3 are arranged on the annular bottom wall 101A opposite to the main light assembly 200, so the main sensor 2 can timely and accurately detect the first lighting light provided by the main light assembly 200 and can provide the detected lighting light detection signal to the control part 3 timely. The light intensity sensor 40, the human sensor 41 and the rechargeable battery 5 may be arranged on the annular top wall 101B, so that the light intensity sensor 40 and the human sensor 41 can detect the environmental information accurately. It is convenient for the user to replace the rechargeable battery 5 by arranging the rechargeable battery 5 on the annular top wall 101B.

The secondary light assembly may be installed on the main light assembly of the light fixture by fixing the annular bottom wall 101A to the surface ring of the main light assembly in a manner of the magnetic connection or mechanical connection. The pins may be arranged on the annular bottom wall 101A of the secondary light assembly, so that the pins may be inserted into the corresponding jack arranged on the surface ring of the main light assembly when the secondary light assembly is installed on the main light assembly, so as to realize the mechanical connection and electrical connection between the secondary light assembly and the main light assembly.

In addition, an example of the secondary light assembly may be a night light assembly with a lower light intensity. The night light assembly may be installed on the main light assembly of a down light fixture to form a down light fixture with the night light assembly and the main light assembly. The intensity of the lighting light emitted by the night light assembly is lower than that of the main light assembly, and the turning on and off of the main light assembly is controlled by a switch, a remote control, and a Bluetooth or Wifi intelligent mode.

Figure 4:
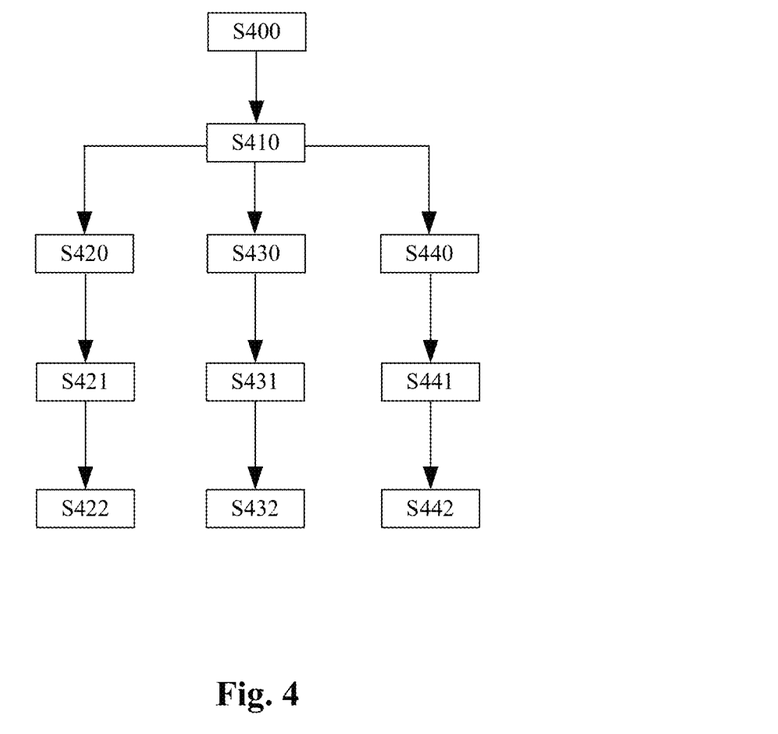
FIG. 4 is a flowchart of a method for controlling a secondary light assembly according to an embodiment of the disclosure.

FIG. 4 is a flowchart of a method for controlling a secondary light assembly according to an embodiment of the disclosure.

As shown in FIG. 4, the method starts from S400. At S400, the first lighting light of the main light assembly is detected by the main sensor of the secondary light assembly, and the lighting light detection signal is generated according to a detection result. Next, at S410, a plurality of brightness variation rules are determined according to the lighting light detection signal.

The method further includes that: when it is determined that the first lighting light has the first brightness variation rule at S410, S420 is performed. At S420, the light emitting devices are controlled to operate in the first operation mode as the night light mode; then, at S421, the environmental information in the environment where the light fixture is located is detected, and an environment detection signal is generated when the predetermined environmental information is detected. S421 may include: detecting the light intensity in the environment and generating the weak light indication signal when the detected light intensity in the environment is lower than a predetermined light intensity; and detecting the presence of a person in the environment and generating the human presence signal when a person is detected in the environment. Next, at S422, according to the environment detection signal, the light emitting devices is controlled to operate according to a corresponding light emitting logic of a plurality of different light emitting logics. Specifically, the light emitting devices is controlled to emit light when the generated environment detection signal has both the weak light indication signal and the human presence signal; and the light emitting devices is controlled to not emit light when the generated environment detection signal has only the weak light indication signal or only the human presence signal.

The method further includes that: when it is determined that the first lighting light has the second brightness variation rule at S410, S430 is performed. At S430, the light emitting devices are controlled to operate in the second operation mode as the synchronous mode. Next, at S431, it is determined that the main light assembly is turned on or off according to the lighting light detection signal; then, at S432, the light emitting devices is turned on or off according to the determination result at S431, so that the light emitting devices operates synchronously with the main light assembly.

The method further includes that: when it is determined that the first lighting light has the third brightness variation rule at S410, S440 is performed. At S440, the light emitting devices are controlled to operate in the third operation mode as the atmosphere mode. Next, at S441, it is determined whether the main light assembly is turned off according to the lighting light detection signal, and when it is determined that the main light assembly is turned off, S442 is performed; then, at S442, the light emitting devices are controlled to emit light in a specific pattern.

The above specifically describes the preferred exemplary embodiments of the method for controlling a secondary light assembly, but the disclosure is not limited to this.

As another example, the method may include determining that the main light assembly is turned off according to the lighting light detection signal, and determining that the light intensity of the environment where the light fixture is located is weak according to the received weak light indication signal and there is a person according to the received human presence signal, and thus the light emitting devices are controlled to light up to provide lighting for the person in the environment.

As yet another example, the method may include determining that the main light assembly is turned off according to the lighting light detection signal and the person is moving frequently, that is, the person may be dancing according to the human presence signal, and the light emitting devices are controlled to emit light in a specific pattern.

As yet another example, the method may include determining that the main light assembly is turned on according to the lighting light detection signal and that the user is walking up and down the stairs according to the received human presence signal, the light emitting devices are controlled to emit light so as to provide the user with a wider range of strong lighting, thereby facilitating the user to walk up and down the stairs.

According to the disclosure, by detachably installing the secondary light assembly such as the night light assembly on the main light assembly to realize the light fixture with both the main light and the night light, the structure of the light fixture formed by integrating the night light assembly and the main light assembly can be simplified, the flexibility of design changes of the night light assembly can be improved, the user convenience can be improved, the cost for driving the night light assembly can be reduced, and the value of the night light assembly can be increased.

It is apparent that the described embodiments are only a part of the embodiments of the present application but not all. On the basis of the embodiment of the present application, all other embodiments obtained on the premise of no creative work of those skilled in the art should fall within the protection scope of the present application.

It is to be noted that terms used herein are only to describe specific embodiments, and are not intended to limit the exemplary embodiments of the present application. As used herein, unless otherwise explicitly indicated in the context, a singular form is also intended to include a plural form. In addition, it is also to be understood that when the terms "include" and/or "have" are used in the description, they are intended to indicate the presence of features, steps, operations, devices, components, and/or combinations thereof.

It should be noted that the specification and claims of the disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the disclosure described here can be implemented in a sequence other than sequences graphically shown or described here.

The above is only the preferred embodiments of the present disclosure and not intended to limit the present disclosure; for those skilled in the art, the present disclosure may have various modifications and changes. Any modifications, equivalent replacements, improvements and the like within the spirit and principle of the present application should fall within the protection scope of the claims of the present application.

What is claimed is:

1. A secondary light assembly, which can be mounted on a main light assembly of a light fixture, the main light assembly being configured to provide first lighting light;
the secondary light assembly being shaped like a ring and comprising:
light emitting devices being disposed along an entire circumference of a peripheral side wall of the secondary light assembly and configured to provide second lighting light;
a main sensor configured to detect the first lighting light of the main light assembly and generate a lighting light detection signal according to a detection result; and
a control part configured to receive the lighting light detection signal from the main sensor and control the light emitting devices of the secondary light assembly at least based on the lighting light detection signal;
wherein the main light assembly is detachably fixed to a bottom surface of the secondary light assembly.

2. The secondary light assembly according to claim 1, wherein the control part is further configured to determine a plurality of brightness variation rules of the first lighting light according to the lighting light detection signal, and control, according to each of the plurality of brightness variation rules, the light emitting devices of the secondary light assembly to operate in a corresponding operation mode of a plurality of operation modes.

3. The secondary light assembly according to claim 2, wherein when the first lighting light is determined to have a first brightness variation rule of the plurality of brightness variation rules according to the lighting light detection signal, the control part controls the light emitting devices to operate in a first operation mode of the plurality of operation modes;
wherein the secondary light assembly further comprises:
an environmental information sensor configured to detect environmental information in an environment where the light fixture is located and generate an environment detection signal when predetermined environmental information is detected; and
wherein in the first operation mode, the control part controls, according to the environment detection signal, the light emitting devices to operate according to a corresponding light emitting logic of a plurality of different light emitting logics.

4. The secondary light assembly according to claim 3, wherein the environment detection signal comprises a weak light indication signal and/or a human presence signal, and the environmental information sensor comprises:
a light intensity sensor configured to detect a light intensity in the environment and generate the weak light indication signal when the detected light intensity in the environment is lower than a predetermined light intensity; and
a human sensor, configured to detect a presence of a person in the environment and generate the human presence signal when the person is detected in the environment.

5. The secondary light assembly according to claim 4, wherein the plurality of different light emitting logics are configured to:
control the light emitting devices to emit light when the control part receives the weak light indication signal and the human presence signal; and
control the light emitting devices to not emit light when the control part receives only the weak light indication signal or only the human presence signal.

6. The secondary light assembly according to claim 4, further comprising a rechargeable battery configured to supply power to the main sensor, the light intensity sensor, the human sensor, the control part and the light emitting devices.

7. The secondary light assembly according to claim 6, wherein the main light assembly can supply power to the main sensor, the light intensity sensor, the human sensor, the control part and the light emitting devices in either a wireless coil power supply mode or a wired power supply mode and charge the rechargeable battery.

8. The secondary light assembly according to claim 6, further comprising an annular bottom wall and an annular top wall being parallel and opposite to the annular bottom wall, wherein the peripheral side wall is sandwiched between the annular bottom wall and the annular top wall; and
wherein the main sensor and the control part are arranged on the annular bottom wall opposite to the main light assembly, and the light intensity sensor, the human sensor and the rechargeable battery are arranged on the annular top wall.

9. The secondary light assembly according to claim 8, wherein the secondary light assembly can be installed on the main light assembly by fixing the annular bottom wall to a surface ring of the main light assembly by means of magnetic connection.

10. The secondary light assembly according to claim 3, wherein when the first lighting light is determined to have a second brightness variation rule of the plurality of brightness variation rules according to the lighting light detection signal, the control part controls the light emitting devices to operate in a second operation mode of the plurality of operation modes; and
wherein in the second operation mode, the control part is further configured to determine the turning on or off or other lighting modes of the main light assembly according to the lighting light detection signal, and to control the turning on or off or the of a corresponding lighting mode of the light emitting devices according to a determination result, so that the light emitting devices operate synchronously with the main light assembly.

11. The secondary light assembly according to claim 3, wherein when the first lighting light is determined to have a third brightness variation rule of the plurality of brightness variation rules according to the lighting light detection signal, the control part controls the light emitting devices to operate in a third operation mode of the plurality of operation modes; and
  wherein in the third operation mode, the control part is further configured to determine whether the main light assembly is turned off according to the lighting light detection signal, and control the light emitting devices to emit light in a specific pattern when it is determined that the main light assembly is turned off.

12. A light fixture comprising the main light assembly and the secondary light assembly according to claim 1, the secondary light assembly being installed on the main light assembly to form the light fixture, wherein the turning on and off of the main light assembly is controlled by a switch, a remote control, and a Bluetooth or WIFI intelligent method.

13. A night light assembly, which can be mounted on a main light assembly of a light fixture, the main light assembly being configured to provide first lighting light,
  the night light assembly being shaped like a ring and comprising:
    light emitting devices being disposed along an entire circumference of a peripheral side wall of the night light assembly and configured to provide second lighting light, a light intensity of the second lighting light is lower than that of the first lighting light;
    a main sensor configured to detect the first lighting light of the main light assembly and generate a lighting light detection signal according to a detection result; and
    a control part configured to receive the lighting light detection signal from the main sensor and control the light emitting devices of the night light assembly at least based on the lighting light detection signal;
  wherein the main light assembly is detachably fixed to a bottom surface of the night light.

14. A method for controlling a secondary light assembly being (i) shaped like a ring and (ii) configured for installation on a main light assembly of a light fixture, the main light assembly being configured to provide first lighting light, and the secondary light assembly further comprising light emitting devices disposed along an entire circumference of a peripheral side wall of the secondary light assembly and configured to provide second lighting light,
  the method comprising:
    detecting the first lighting light of the main light assembly and generating a lighting light detection signal according to a detection result; and
    controlling the light emitting devices of the secondary light assembly at least based on the lighting light detection signal;
  wherein the main light assembly is detachably fixed to a bottom surface of the secondary light assembly.

15. The method according to claim 14, further comprising:
  determining a plurality of brightness variation rules of the first lighting light according to the lighting light detection signal; and
  controlling, according to each of the plurality of brightness variation rules, the light emitting devices of the secondary light assembly to operate in a corresponding operation mode of a plurality of operation modes.

16. The method according to claim 15, further comprising:
  when the first lighting light is determined to have a first brightness variation rule of the plurality of brightness variation rules, controlling the light emitting devices to operate in a first operation mode of the plurality of operation modes;
  wherein the first operation mode comprises:
    detecting environmental information in an environment where the light fixture is located;
    generating an environment detection signal when predetermined environmental information is detected; and
    controlling, according to the environment detection signal, the light emitting devices to operate according to a corresponding light emitting logic of a plurality of different light emitting logics.

17. The method according to claim 16, wherein generating the environment detection signal comprises:
  detecting a light intensity in the environment and generating a weak light indication signal when the detected light intensity in the environment is lower than a predetermined light intensity; and
  detecting a presence of a person in the environment and generating a human presence signal when the person is detected in the environment.

18. The method according to claim 17, wherein,
  the plurality of different light emitting logics comprise:
  controlling the light emitting devices to emit light when the generated environment detection signal has the weak light indication signal and the human presence signal; and
  controlling the light emitting devices to not emit light when the generated environment detection signal has only the weak light indication signal or only the human presence signal.

19. The method according to claim 16, further comprising:
  when the first lighting light is determined to have a second brightness variation rule of the plurality of brightness variation rules, controlling the light emitting devices to operate in a second operation mode of the plurality of operation modes;
  wherein the second operation mode comprises:
    determining the turning on or off or other lighting modes of the main light assembly according to the lighting light detection signal; and
    controlling the turning on or off of a corresponding lighting mode of the light emitting devices according to a determination result, so that the light emitting devices operate synchronously with the main light assembly.

20. The method according to claim 16, further comprising:
  when the first lighting light is determined to have a third brightness variation rule of the plurality of brightness variation rules, controlling the light emitting devices to operate in a third operation mode of the plurality of operation modes;
  wherein the third operation mode comprises:
    determining, according to the lighting light detection signal, whether the main light assembly is turned off; and controlling the light emitting devices to emit light in a specific pattern when it is determined that the main light assembly is turned off.

21. A control unit used in a secondary light assembly, the secondary light assembly being (i) shaped like a ring (ii) and configured for installation on a main light assembly of a light fixture, the main light assembly being configured to provide first lighting light, and light emitting devices of the secondary light assembly being disposed along an entire circumference of a peripheral side wall of the secondary light assembly and configured to provide second lighting light, the control unit comprising:
   a main sensor configured to detect the first lighting light of the main light assembly and generate a lighting light detection signal according to a detection result; and
   a control part configured to receive the lighting light detection signal from the main sensor and control the light emitting devices of the secondary light assembly at least based on the lighting light detection signal;
   wherein the main light assembly is detachably fixed to a bottom surface of the secondary light assembly.

* * * * *